United States Patent [19]

Engelhardt et al.

[11] Patent Number: 5,019,112
[45] Date of Patent: May 28, 1991

[54] ROBOTIC FOOD SERVICE PACKAGING SYSTEM

[75] Inventors: K. G. Engelhardt; Roger A. Edwards, both of Carnegie; Whitney S. Sample; Michael F. Sandrof, both of Pittsburgh, all of Pa.

[73] Assignee: Carnegie-Mellon University, Pittsburgh, Pa.

[21] Appl. No.: 378,849

[22] Filed: Jul. 12, 1989

[51] Int. Cl.$^5$ .................. B65B 5/10; B65B 25/00; B25J 11/00
[52] U.S. Cl. .................................. 53/474; 53/238; 53/475; 53/155
[58] Field of Search ............... 53/474, 473, 475, 469, 53/238, 237, 236, 240, 235, 142, 143, 148, 155, 154, 571, 570, 251, 244; 901/40

[56] References Cited

U.S. PATENT DOCUMENTS

| | | | |
|---|---|---|---|
| 3,503,527 | 3/1970 | Devol | 901/40 X |
| 3,842,569 | 10/1974 | McClelland et al. | 53/469 |
| 3,878,596 | 4/1975 | Iwai | 901/40 X |
| 4,731,977 | 3/1988 | Maekawa | 53/475 X |
| 4,814,134 | 3/1989 | Brown | 53/474 X |

FOREIGN PATENT DOCUMENTS

| | | | |
|---|---|---|---|
| 2553327 | 4/1985 | France | 53/475 |
| 2000739 | 1/1979 | United Kingdom | 53/251 |

Primary Examiner—James F. Coan
Attorney, Agent, or Firm—Ansel M. Schwartz

[57] ABSTRACT

A handling and packaging system for utensils comprised of a device for packaging the utensils; and a device for obtaining the utensils and moving them to the packaging device. Preferably, the obtaining device includes N specialized end-effectors which seize the utensils, where $N \geq 1$ and is an integer. A method for utensil handling and packaging. The method comprises the steps of obtaining the utensil and packaging the utensil. Preferably, the obtaining step includes the steps of moving an end-effector in proximity to the utensil. An end-effector for a robot comprising a structure and a device for producing magnetic force to seize objects made of metal. The producing device is supported by the structure. A bin for holding utensils. The bin is comprised of a base; and a container wherein the utensils are stored. The container is supported by the base such that one end of the container is higher than the other end of the container. A bin for holding utensils. The bin is comprised of a base having a center line. The bin is also comprised of a first divider disposed on the base on one side of the center line and offset therefrom. Moreover, there is a second divider disposed on the base of the other side of the center line and also therefrom but not opposite the first divider such that utensils are stored in the base behind the first and second dividers and are maintained in a longitudinal alignment thereby.

9 Claims, 5 Drawing Sheets

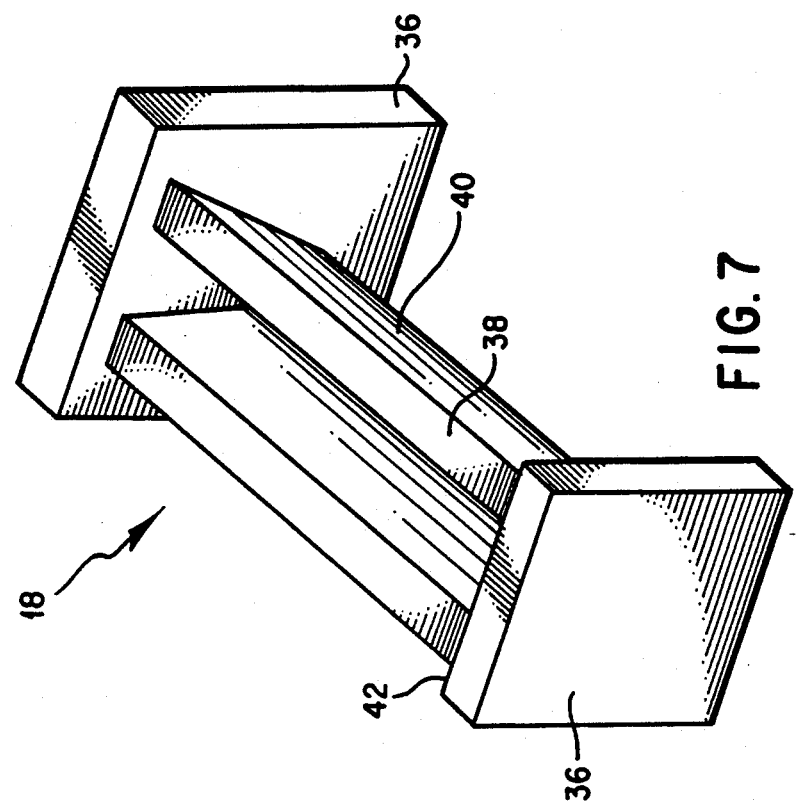
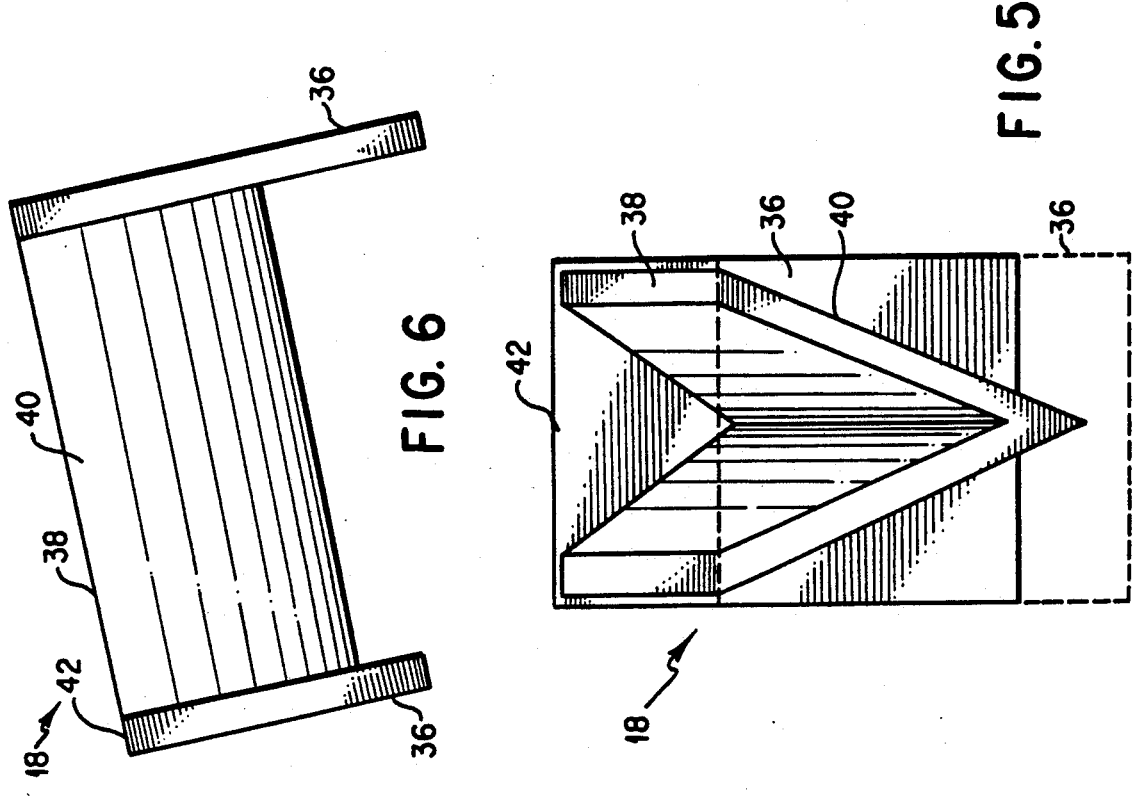

ROBOTIC FOOD SERVICE PACKAGING SYSTEM

FIELD OF THE INVENTION

The present invention is related to robotic handling and packaging system. More specifically, the present invention is related to a utensil handling and packaging system.

BACKGROUND OF THE INVENTION

Robots are currently being made to replace people doing tasks that involve a reoccurring motion. The robots offer the advantages, to name but a few of, not tiring, doing a task essentially the same way again and again, and being able to operate in environments that are inhospitable to humans.

One area that is ideal for the use of robots is the packaging of utensils, such as flatware, which is required to be essentially sterile. The end-effector of a robot can be sterilized such that the flatware handled by the end-effector is not contaminated, as could possibly happen if a person is doing the handling and packaging. Heretofore, there have been no operationally efficient systems which can handle and package flatware. One of the major problems in such systems is the ability of the end-effector to have the dexterity to effectively obtain a single spoon, fork or knife and move it to a location in the system where it is subsequently packaged. For instance, U.S. Pat. No. 4,588,349 discloses a robotic order picking for filling a kit with desired parts. The kit is filled by a robot arm which opens a tray and lets parts therein fall into the kit. The arm never actually handles each individual part.

The present invention handles and packages objects such as utensils in an efficient manner with a dexterity that allows individual packages of utensils, such as a fork, spoon and knife and even a straw to be combined in a package. There is an end-effector that provides this dexterity to the system, and specifically designed bins increase the ability of the end-effector to obtain a single utensil at a given time. Moreover, the present invention pertains to a system which replaces portions of tasks of people rather than the people themselves. The invention serves to asist people in their tasks and as a result increase overall productivity. For a more general discussion of this topic, see K. G. Engelhardt (1988) "Robots in the Service of Humans: Concepts and Methods"; Proceedings of the 1988 IEEE International Workshop on Intelligent Robots and Systems, Tokyo, Japan, Oct. 31 - Nov. 2, 1988.

SUMMARY OF THE INVENTION

The present invention pertains to a handling and packaging system for utensils. The system is comprised of means for packaging the utensils; and means for obtaining the utensils and moving them to the packaging means. Preferably, the obtaining means includes N specialized end-effectors which seize the utensils, where N $\geq 1$ and is an integer.

The present invention pertains to a method for utensil handling and packaging. The method comprises the steps of obtaining the utensil and packaging the utensil. Preferably, the obtaining step includes the steps of moving an end-effector in proximity to the utensil.

The invention pertains to an end-effector for a robot comprising a structure and means for producing magnetic force to seize objects made of metal. The producing means is supported by the structure.

The present invention pertains to a bin for holding utensils. The bin is comprised of a base; and a container wherein the utensils are stored. The container is supported by the base such that one end of the container is higher than the other end of the container.

The present invention pertains to a bin for holding utensils. The bin is comprised of a base having a center line. the bin is also comprised of a first divider disposed on the base on one side of the center line and offset therefrom. Moreover, there is a second divider disposed on the base on the other side of the center line and also offset therefrom but not opposite the first divider such that utensils are stored in the base behind the first and second dividers and are maintained in a longitudinal alignment thereby.

BRIEF DESCRIPTION OF THE DRAWINGS

In the accompanying drawings, the preferred embodiments of the invention and preferred methods of practicing the invention are illustrated in which:

FIG. 5 is an end view of a first embodiment of a bin.

FIG. 6 is a side view of the first embodiment of a bin.

FIG. 7 is a perspective view of the first embodiment of the bin.

DESCRIPTION OF THE PREFERRED EMBODIMENT

Figure 1:
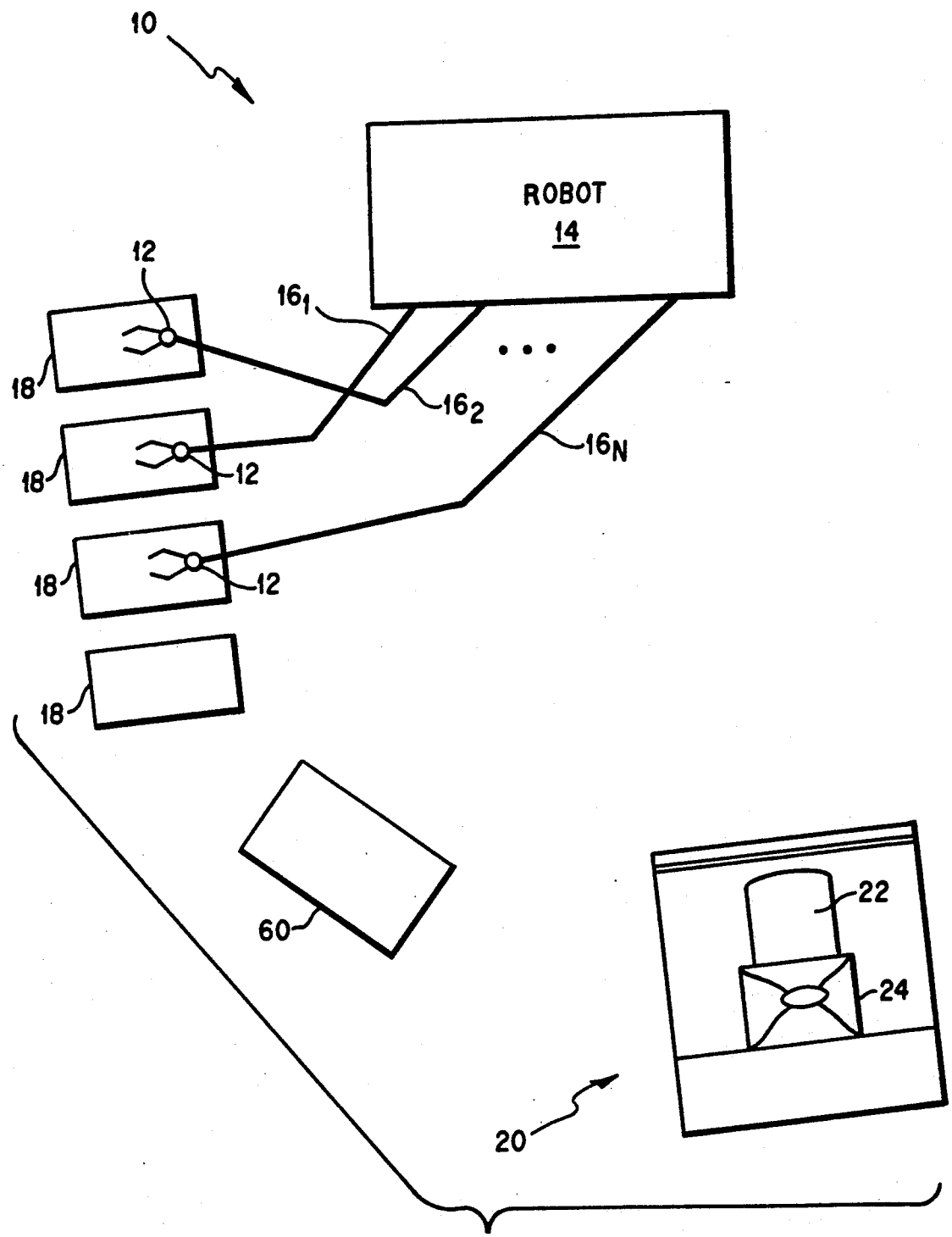
FIG. 1 is a schematic representation of a utensil handling and packaging system.

Referring now to the drawings wherein like reference numerals refer to similar or identical parts throughout the several views, and more specifically to FIG. 1 thereof, there is shown a schematic representation of a handling and packaging system 10 for utensils. Utensils can include flatware, tools, medical instruments or essentially anything that can be gripped by the human hand, but is not limited thereto. The system 10 is comprised of means for packaging the utensils, and means for obtaining the utensils and moving them to the packaging means. The obtaining means can include N specialized end-effectors 12 which seize the utensils, where N $\geq 1$ and is an integer.

The obtaining means can also include a robot 14 attached to the end-effectors 12 for moving the end-effectors 12 such that they seize the utensils and then provide the utensils to the packaging means. Each end-effector 12 can include an arm 16 connected to the robot 12. The arm 16 of the end-effector 14 moves the end-effector 12 attached to it such that it seizes the utensil and then provides the utensil to the packaging means. Preferably, N=1 and the system 10 has one end-effector 12 connected to one arm 16 such that the arm 16 moves the end-effector 12 to seize the utensil provided to the packaging means.

The system 10 can include bins 18 within which the utensils are stored and from which the end-effector 12 seizes the utensil. The utensils are stored in the bins 18 such that at least a side of the utensil being obtained by the end-effector 12 is exposed thereto. The bin 18 is of a shape that ideally causes the utensils stored in them to present as large a surface area as possible to the end-effector 12 to facilitate seizer of the utensil thereby.

The packaging means preferably includes a bagger 20 that holds bag 22. The packaging means also preferably includes a chute 24 communicating with the bag 20 such that when the end-effector 12 provides the utensil to the bagger 20, the utensil goes into the chute 24 and is guided by the chute 24 into the bag 22.

Figure 2:
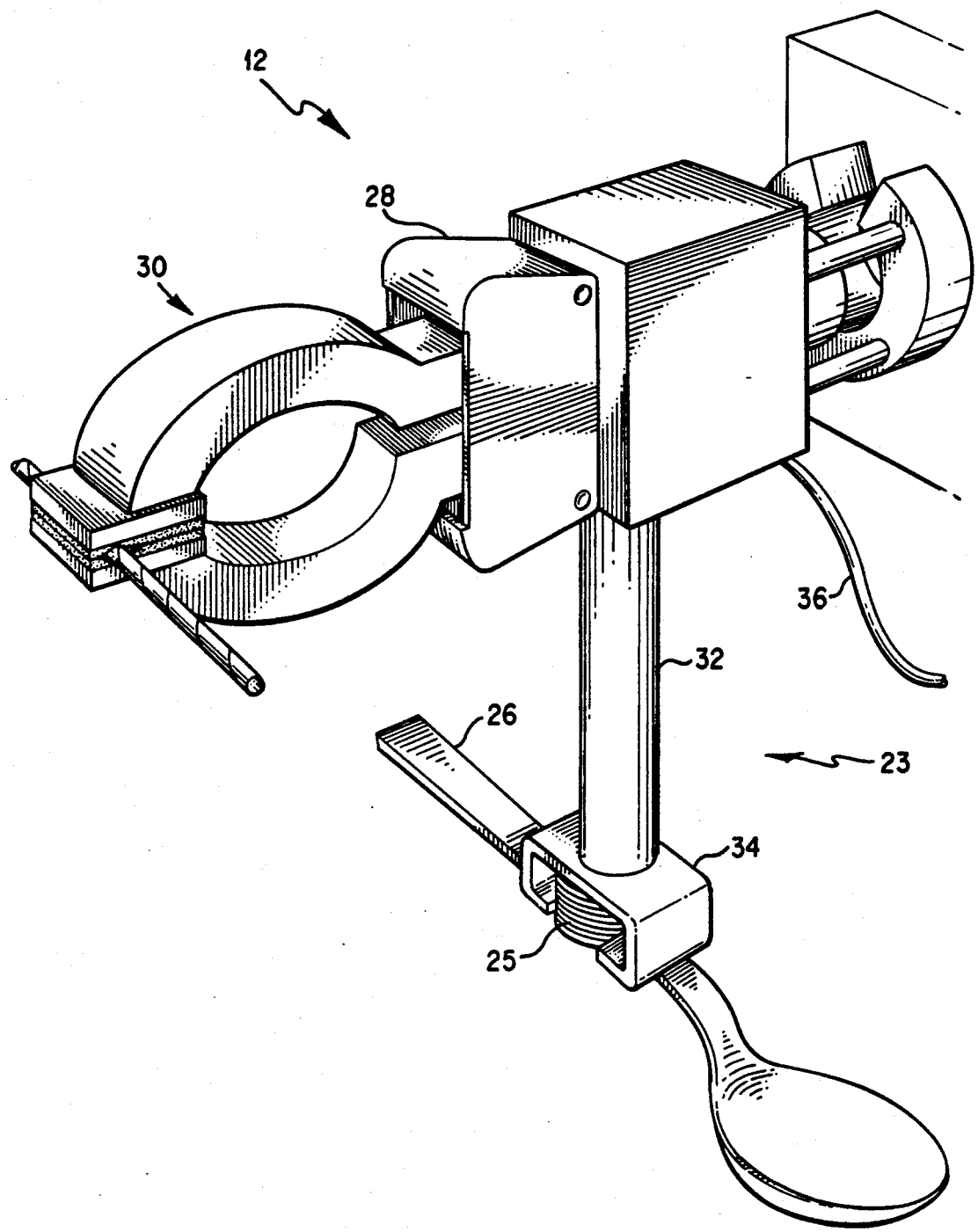
FIG. 2 is a perspective view of an end-effector.
Figure 4:
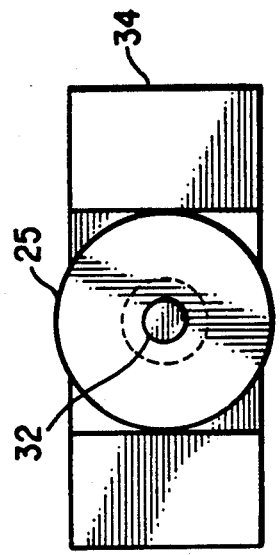
FIG. 4 is an overhead view of a portion of the end-effector.
Figure 3:
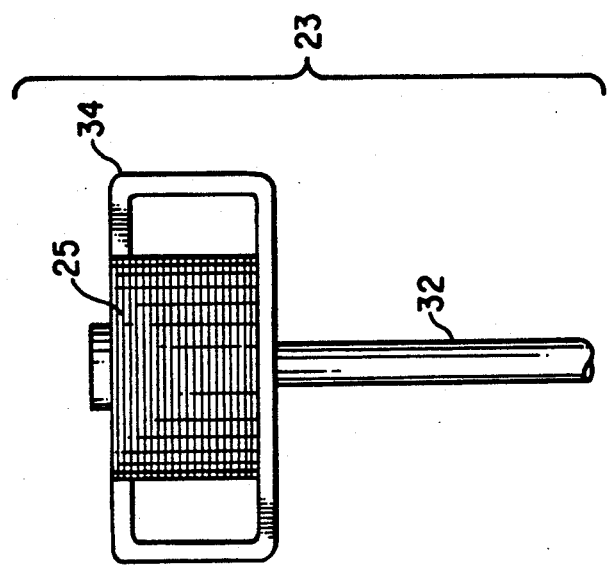
FIG. 3 is a side view of a portion of the end-effector.

Preferably, the end-effector 12 includes means for producing a magnetic force such as a 12 volt relay 25. This relay 25, when electric current is provided to it, produces a magnetic field strong enough to seize a typical metal object such as a utensil, i.e. a fork, spoon or knife. The magnetic field produced, however, is preferably not strong enough to seize more than one utensil. The force seizes the utensil from the bin 18 when the end-effector 12 is placed in proximity to the utensil in the bin 18. Subsequently, the utensil is positioned over the chute 24 and is provided to the chute 24 of the bagger 20 when the relay 25 no longer produces the magnetic force. The end-effector 12 is shown in FIG. 2, which is a perspective view of it. The end-effector 12 includes a structure 23 to support the means for producing a magnetic force to seize objects made of metal.

The end-effector 12 can include a robot arm 16 which is attached to the structure 23 such that the robot arm 16 can position the structure 23 supporting the relay 25 in proximity to the utensil. The utensil can then be seized with the magnetic force of the relay 25, and then moved to another location where it is released when the magnetic force from the relay 25 is no longer sufficient to cause the utensil 26 to be seized.

The arm 16 preferably includes a hand 28 to which the structure 23 is attached. The hand 28 is rotatable and has means 30 for gripping an element, such as a straw (not shown). The gripping means 30 is preferably a set of pinchers that can grab an element. The structure 23 preferably includes an extender 32 that is attached to the hand 28 and extends therefrom, and a housing 34 attached to the extender 32 within which the relay 25 is disposed The relay 25 also preferably includes means 36 for providing electric current, such as electrical leads, to the relay 25 as shown in FIG. 2.

In a first embodiment, the bin 18 for holding utensils 26 includes a base 36 in a container 38 wherein the utensils 26 are stored, as shown in FIGS. 5, 6 and 7 which is an end view and a side view, respectively thereof. The container 38 is supported by the base 36 such that one end 40 of the container 38 is higher than the other end 42 of the container 38. Preferably, the container 38 is in the shape of a V with utensils 26 stored in the container 38. By having one end 40 higher than the other end 42, the presentation of the bin 18 to the end effector 12 is enhanced. The V shape of the bin causes the utensils therein to be organized in parallel to each other so essentially the same view of each utensil therefore is presented to the end effector 12.

Figure 9:
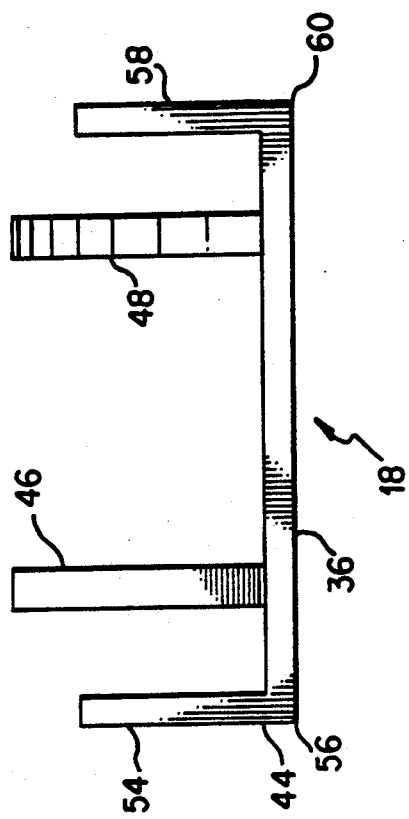
FIG. 9 is a side view of the second embodiment of the bin.
Figure 8:
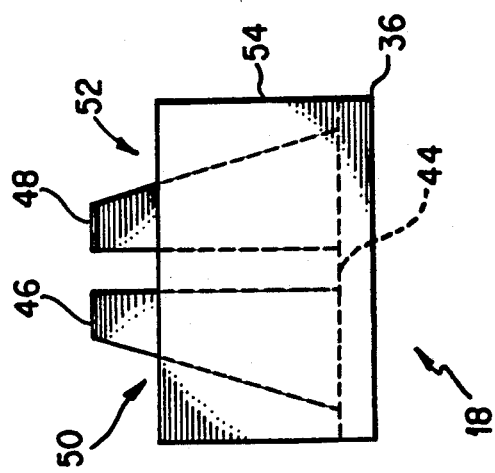
FIG. 8 is an end view of a second embodiment of a bin.

In a second embodiment of the bin 18, the base 36 has a center line 44 as shown in FIG. 8 and FIG. 9 which is an end view and a side view, respectively thereof. The second embodiment of the bin 18 also is comprised of a first divider 46 disposed on the base 36 on one side of the center line 44 and offset therefrom. The second embodiment of the bin 18 also includes a second divider 48 disposed on the base 36 on the other side 52 of the center line 44 and offset therefrom but not opposite the first divider 46 such that utensils 26 are stored in the base 36 between the first and second dividers and are maintained in longitudinal alignment thereby. The base 36 of the second embodiment of the bin 18 is preferably open on the sides parallel the center line 44, and open on the top, but has a first end member 54 on one end 56 and a second end member 58 on the other end 60. The first divider 46 and second divider 48 are preferably disposed on the base 36 perpendicular to the center line 44. Preferably, the utensils are stacked on top of each other such that only one utensil is presented to the end effector 12 at a time and maintained that way by the first and second dividers.

The present invention pertains to a method for utensil 26 handling and packaging. The method comprises the steps of obtaining the utensil 26; and packaging the utensil 26. Preferably, the obtaining step includes the steps of moving an end-effector 12 in proximity to the utensil 12; and seizing the utensil 26 by the end-effector 12. The utensil 26 is disposed in the bin 18 and the bagger 20 performs the step of packaging.

Preferably, the seizing step includes the steps of producing a magnetic force in the end-effector 12 such that the utensil 36 is seized by the end-effector 12; moving the end-effector 12 with the utensil 26 to the bagger 20; and turning off the magnetic force so the utensil 26 is released by the end-effector 12 and the utensil goes into a bag 22 in the bagger 20.

In the operation of the invention, the end-effector 12 is positioned over a bin 18 such that the relay 25 is in proximity to a spoon in the bin 18. Current is then provided to the relay through the electric leads When the relay 25 receives the current, a magnetic force results causing the end-effector 12 to seize the spoon. See FIG. 2. The bin 18 aids in presenting the utensil to the relay 25 to be seized. The bin is V shaped causing the utensils placed in it to align essentially in parallel to each other and present as large a surface area as possible to the end-effector 12. The magnetic field produced by the relay 25 is large enough to seize one utensil which is held in direct contact to the relay 25, but is not strong enough to seize any additional utensils Thus, it is ensured that not more than one utensil at a time is provided to the bag 22.

The arm 16 next moves the end-effector 12 having the spoon over the chute 24 of the bagger 20. Current is then stopped to the relay 25 causing the magnetic force to stop. When magnetic force from the magnetic 25 stops, the spoon is released and falls into the chute 24 of the bagger 20, which guides it into the bag 22.

The robot 14 then repositions the arm 16 such that the the above process is repeated with a soup spoon, a fork and a knife located in respective bins 18. The robot 14 next positions the arm 16 such that the pinchers of the hands 28 are positioned before straws in a straw holder 60. The pinchers are then opened and moved forward to be positioned about the straw which is presented to it by the straw holder 60. The pinchers then close on the straw gripping it. The robot arm 16 is moved by the robot 14 such that the pinchers holding the straw are over the chute 24. The pinchers open, releasing the straw such that it falls into the chute 24 and then into the bag 22. The bag 22, now having four different utensils and the straw is sealed by the bagger 20 and removed. A new bag 22 is put into place in the bagger 20 and the above process is repeated.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for utensil handling and packaging comprising the steps of:
    moving an end-effector in proximity to the utensil disposed in a bin;
    seizing the utensil by the end-effector; and
    packaging the utensil with a bagger.

2. A method as described in claim 1 wherein the seizing step includes the steps of producing on a magnetic force in the end-effector such that the utensil is seized by the end-effector; moving the end-effector with the utensil to the bagger; and turning off the magnetic force so the utensil is released by the end-effector and the utensil goes into a bag in the bagger.

3. A handling and packaging system for utensils comprising:
    means for packaging the utensils; and
    means for obtaining one utensil at a time from a bin with a plurality of utensils, each of which is in contact with at least another utensil therein, and moving said utensil to the packaging means.

4. A handling and packaging system for utensils comprising:
    means for packaging the utensils;
    at least one bin which as a plurality of utensils, each of which is in contact with at least another utensil therein; and
    means for obtaining one utensil at a time from the bin and moving them to the packaging means.

5. A method for utensil handling and packaging comprising the steps of:
    obtaining the utensil from a bin which holds a plurality of utensils, each of which is in contact with at least another utensil therein; and packaging the utensil.

6. A handling and packaging system for utensils comprising:
    means for packaging the utensils;
    a robot;
    an end-effector with an arm connected to the robot, said end-effector connected to the arm such that the arm moves the end-effector to seize the utensil and provide it to the packaging means; and
    bins within which the utensils are stored such that at least a side of the utensil being obtained by the end-effector is exposed thereto.

7. A system as described in claim 6 wherein the packaging means includes a bagger that holds a bag.

8. A system as described in claim 8 wherein the packaging means includes a chute communicating with the bag such that when the end-effector provides the utensil to the bagger, the utensil goes into the chute and is guided by the chute into the bag.

9. A system as described in claim 8 wherein the end-effector includes means for producing a magnetic force, said force seizing the utensil from the bin when the end-effector is placed in proximity to the utensil in the bin, and said utensil being provided to the chute of the bagger when the producing means no longer produces the force after the arm has moved the end-effector in proximity to the chute such that the utensil then goes into the chute.

* * * * *